(12) United States Patent
Cho et al.

(10) Patent No.: US 7,003,205 B2
(45) Date of Patent: Feb. 21, 2006

(54) WIDE-BAND DISPERSION CONTROLLED OPTICAL FIBER

(75) Inventors: Jeong-Sik Cho, Taejonkwangyok-shi (KR); Mun-Hyun Do, Kyongsangbuk-do (KR); Jin-Seong Yang, Kumi-shi (KR); Sang-Ho Cha, Kumi-shi (KR); Ju-Chang Han, Kumi-shi (KR); Yun-Geun Jang, Kumi-shi (KR); Ki-Moon Kwak, Kyongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 10/634,699

(22) Filed: Aug. 5, 2003

(65) Prior Publication Data

US 2004/0141705 A1    Jul. 22, 2004

(30) Foreign Application Priority Data

Jan. 20, 2003    (KR) .................. 10-2003-0003770

(51) Int. Cl.
*G02B 6/02*    (2006.01)
*G02B 6/22*    (2006.01)
*G02B 6/16*    (2006.01)
*G02B 6/18*    (2006.01)

(52) U.S. Cl. ............ 385/126; 385/123; 385/124; 385/125; 385/127; 385/128

(58) Field of Classification Search ........ 385/123–128, 385/141–145
See application file for complete search history.

(56) References Cited

U.S. PATENT DOCUMENTS

| | | | | |
|---|---|---|---|---|
| 5,684,909 A | * | 11/1997 | Liu | 385/127 |
| 5,878,182 A | * | 3/1999 | Peckham | 385/123 |
| 5,905,838 A | * | 5/1999 | Judy et al. | 385/123 |
| 6,181,717 B1 | * | 1/2001 | Kner et al. | 372/20 |
| 6,205,279 B1 | * | 3/2001 | Kim et al. | 385/127 |
| 6,266,467 B1 | * | 7/2001 | Kato et al. | 385/123 |
| 6,434,310 B1 | * | 8/2002 | Liu et al. | 385/123 |
| 6,449,416 B1 | * | 9/2002 | Lee et al. | 385/127 |

(Continued)

FOREIGN PATENT DOCUMENTS

JP    10078524    3/1998

(Continued)

*Primary Examiner*—Frank G. Font
*Assistant Examiner*—Ryan Lepisto
(74) *Attorney, Agent, or Firm*—Cha & Reiter, L.L.C.

(57) ABSTRACT

Disclosed is a wide-band dispersion controlled optical fiber. The optical fiber enables the use of optical signals in various wavelength regions in a wavelength division multiplexing mode communication network by controlling the position of the zero dispersion wavelength, and enables long distance transmission by controlling dispersion slope and bending loss. Furthermore, there is an advantage in that the optical fiber enables not only short distance transmission but also middle/long distance transmission using a single type of optical fiber because the optical fiber is controlled to have negative dispersion values in the O-band wavelength region and positive dispersion values with small deviations in the C-band and L-band wavelength regions.

15 Claims, 8 Drawing Sheets

U.S. PATENT DOCUMENTS

| | | | |
|---|---|---|---|
| 6,535,677 B1 * | 3/2003 | Tanaka et al. | 385/123 |
| 6,546,177 B1 * | 4/2003 | Matsuo et al. | 385/123 |
| 6,577,800 B1 * | 6/2003 | Sarchi et al. | 385/123 |
| 6,751,389 B1 * | 6/2004 | Tirloni | 385/127 |
| 6,819,850 B1 * | 11/2004 | Sillard et al. | 385/127 |
| 2002/0197036 A1 * | 12/2002 | Kim et al. | 385/123 |
| 2004/0013381 A1 * | 1/2004 | Sillard et al. | 385/127 |
| 2004/0062500 A1 * | 4/2004 | Arai et al. | 385/127 |
| 2004/0197063 A1 * | 10/2004 | Changdar et al. | 385/127 |

FOREIGN PATENT DOCUMENTS

| | | |
|---|---|---|
| WO | WO 00/36444 | 6/2000 |
| WO | WO 03/001274 | 1/2001 |
| WO | WO 02/27367 | 4/2002 |

* cited by examiner

WIDE-BAND DISPERSION CONTROLLED OPTICAL FIBER

CLAIM OF PRIORITY

This application claims priority to an application entitled "Wide-band Dispersion Controlled Optical Fiber," filed with the Korean Intellectual Property Office on Jan. 20, 2003 and assigned Ser. No. 2003-3770, the contents of which are hereby incorporated by reference.

BACKGROUND OF THE INVENTION

1. Field of the Invention

The present invention relates to an optical fiber, and in particular to a wide-band dispersion controlled optical fiber which is capable of being used for medium/long distance transmission while using optical signals of wide wavelength band.

2. Description of the Related Art

In an optical communication network for transferring high capacity information in Wavelength Division Multiplexing (WDM) mode, N optical signals with different wavelengths are multiplexed and concurrently transmitted through one strand of an optical fiber. The C-band wavelength region (1530 nm to 1565 nm) and the L-band wavelength region (1570 nm to 1605 nm) are principally used in the optical signals transmitted through the optical fiber, in which the transmission characteristic of optical signals is good. Meanwhile, for the purpose of wide-band/large-capacity transmission in an optical communication network of the WDM mode, researches have been vigorously made in order to use the O-band wavelength region (1285 nm to 1330 nm) and the S-band wavelength region (1460 nm to 1530 nm).

FIG. 1 is a graph showing the dispersion properties of optical fibers according to an example of the prior art. In the graph shown in FIG. 1, a first curve 11 shows a dispersion characteristic of a single mode optical fiber. Second and third curves 13 and 15 show dispersion properties of positive dispersion optical fibers, respectively. A fourth curve 17 shows a dispersion characteristic of a negative dispersion optical fiber. Second and third curves 13 and 15 indicate optical fibers which have positive dispersion values at 1550 nm wavelength, and fourth curve 17 indicates an optical fiber which has a negative dispersion value at 1550 nm wavelength.

Referring to the dispersion characteristic indicated by first curve 11, the C-band wavelength region exhibits dispersion values in the range of 14 to 19 ps/nm/km and the L-band wavelength region exhibits dispersion values larger than those in the C-band wavelength region. Therefore, a dispersion compensator is essentially required in order to employ such a single mode optical fiber in wide-band/large-capacity communication networks, if a single mode optical fiber exhibits the dispersion characteristic as indicated by first curve 11 in WDM communication mode.

In first curve 11, a zero dispersion wavelength is positioned in the O-band wavelength region, which causes deterioration of signal quality due to Four Wave Mixing (FMW) at the time of receiving and sending an optical signal of the O-band wavelength region. The FMW is an example of a non-linear phenomenon produced when sending an optical signal. Due to FMW, two optical signals with different wavelengths are combined, thereby producing one or more new optical signals which distort the assigned optical signals. The FMW is generated at a zero dispersion wavelength at which the phases of optical signals coincide with each other.

The single mode optical fiber with the dispersion characteristic as indicated by first curve 11 has large dispersion values. As a result, the cost is increased for compensating dispersion in WDM mode. Therefore, it is not efficient to construct a wide-band communication network using a single mode optical fiber in a WDM communication network. Accordingly, a single mode optical fiber is mainly used in Time Division Multiplexing (TDM) communication networks for wide-band/large-capacity transmission through the single mode optical fiber.

However, when compared to the TDM communication mode, the WDM communication mode is advantageous in that transmission capacity is greatly increased at small expense. Due to such an advantage, the WDM mode has been continuously developed for optical communication networks.

Because the dispersion values of second and third curves 13 and 15 are distributed lower than those of first curve 11, a cost savings is achieved in that relatively little dispersion compensation is required when constructing a wide-band/large-capacity network of the C-band and the L-band wavelength regions. Second curve 13 exhibits dispersion characteristic of a large effective area optical fiber which has an enlarged effective cross-section area. Third curve 15 indicates a reduced dispersion slope optical fiber which has a reduced dispersion slope.

As shown by second curve 13, a large effective area optical fiber enlarges an effective cross-section area in order to achieve dispersion values which are not less than a predetermined level, thereby avoiding non-linear phenomena such as four wave mixing (FWM). However, because such a large effective area optical fiber has relatively large dispersion values in the L-band wavelength region, dispersion compensation is essentially required. Furthermore, there is a problem in that if the effective cross-section area increases, Raman amplification efficiency decreases.

A reduced slope optical fiber with a dispersion characteristic as indicated by third curve 15 is reduced in difference of dispersion values between the C-band and L-band wavelength regions by reducing the dispersion slope. Therefore, the reduced slope optical fiber reduces the relative difference of dispersion values between the C-band and L-band in a wide-band/large-capacity communication network.

However, because the zero dispersion wavelength of a positive dispersion optical fiber is located in the wavelength region of 1460 nm to 1500 nm as indicated by the second and third curves, it is impossible to use Raman amplification which is used in long distance transmission. Due to the characteristic of the Raman amplification mode, a pumping light which has a wavelength about 100 nm lower than the optical signal that is amplified is used for optical fiber signal amplification. A pumping light of a wavelength region of 1470 nm to 1505 nm is used for amplifying an optical signal of the L-band wavelength region. That is, the wavelengths of pumping light used for amplifying L-band optical signals in the Raman amplification mode are within the wavelength region in which the zero dispersion wavelength of a positive dispersion optical fiber is positioned. Because this induces a non-linear phenomenon such as FWM, it is not efficient to use a positive optical fiber as mentioned above in a wide-band/large-capacity communication network. In addition, a problem exists because the zero dispersion wavelength of a positive dispersion optical fiber is located in the S-band wavelength region of 1460 nm to 1530 nm. Thus, a non-linear phenomenon such as FWM is induced, and it is impossible to use the S-band wavelength region.

A negative dispersion optical fiber with dispersion characteristic as indicated by fourth curve 17 has a zero dispersion wavelength positioned in the wavelength region of 1610 nm to 1700 nm. Therefore, it enables transmission of an optical signal of the C-band and L-band wavelength regions. Such a negative dispersion optical fiber is used only in middle/long distance transmission in the range of about several hundreds km. However, it cannot be used for an optical signal in the S-band or O-band wavelength region because absolute dispersion values are so large.

As described above, despite the fact that wide-band/large-capacity transmission is essentially required since optical communication networks, in particular WDM communication networks have been continuously developed, conventional optical fibers use only optical signals in the C-band wave length region or L-band wavelength region. This is because the positions of zero dispersion wavelengths or dispersion values are not capable of being tuned. Furthermore, a negative optical fiber is useful in middle/long distance transmission networks of about several hundreds km. A positive optical fiber is used in long distance transmission exceeding this range. Consequently, the construction cost of optical communication networks are dually increased, since different types of optical fibers are used in accordance with the transmission length.

SUMMARY OF THE INVENTION

Accordingly, the present invention has been made to reduce or overcome the above-mentioned limitations occurring in the prior art. One object of the present invention is to provide a wide-band dispersion controlled optical fiber which is capable of transmitting optical signals of various wavelength regions and a wide-band dispersion controlled optical fiber which enables not only short distance transmission but also middle/long distance transmission using one type of optical fiber.

In accordance with the principles of the present invention a wide-band dispersion controlled optical fiber is provided, characterized in that the fiber is controlled/tuned, using respective core and clad diameters and distribution of refractive indexes, to have (1) the position of the zero dispersion wavelength, and (2) negative dispersion values in the O-band wavelength region and positive dispersion values with small deviations in the C-band and L-band wavelength regions.

In one illustrative embodiment, the a wide-band dispersion controlled optical fiber is provided having includes a cut-off wavelength is 1285 nm or less, dispersion values are −12 to −4 ps/nm/km in a wavelength region of 1285 nm to 1330 nm and 8 to 14 ps/nm/km at 1625 nm wavelength, and a zero dispersion wavelength is positioned in a wavelength region below 1430 nm, wherein the effective cross-section area at 1550 nm wavelength is less than 75 $\mu m^2$, and wherein the difference of losses between the 1550 nm wavelength and the 1625 nm wavelength is 0.03 dB/km or less.

In another illustrative embodiment a wide-band dispersion controlled optical fiber is provided having a cut-off wavelength is 1285 nm or less, dispersion values are −12~−4 ps/nm/km in a wavelength region of 1285 nm~1330 nm and 8~14 ps/nm/km at 1625 nm wavelength, and dispersion slope is 0.074 ps/nm²/km or less at zero dispersion wavelength.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENTS

Figure 1:
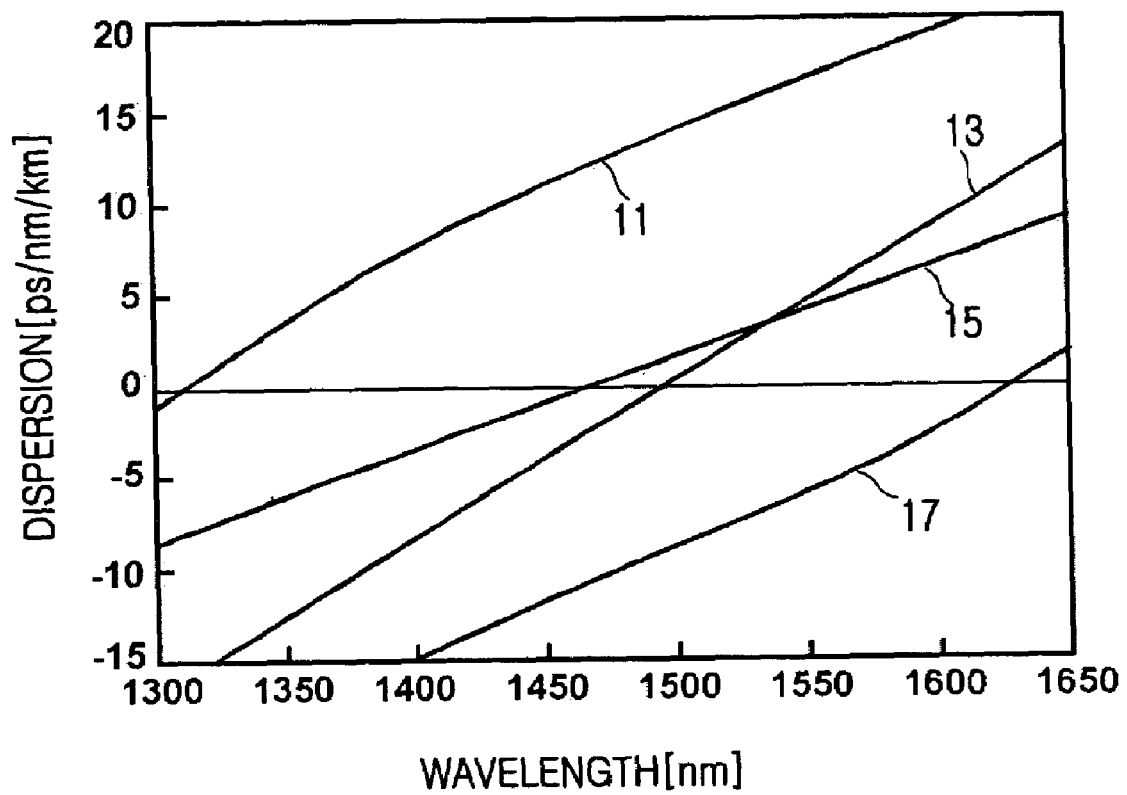
FIG. 1 is a graph showing the dispersion characteristics of conventional optical fibers.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

Figure 2:
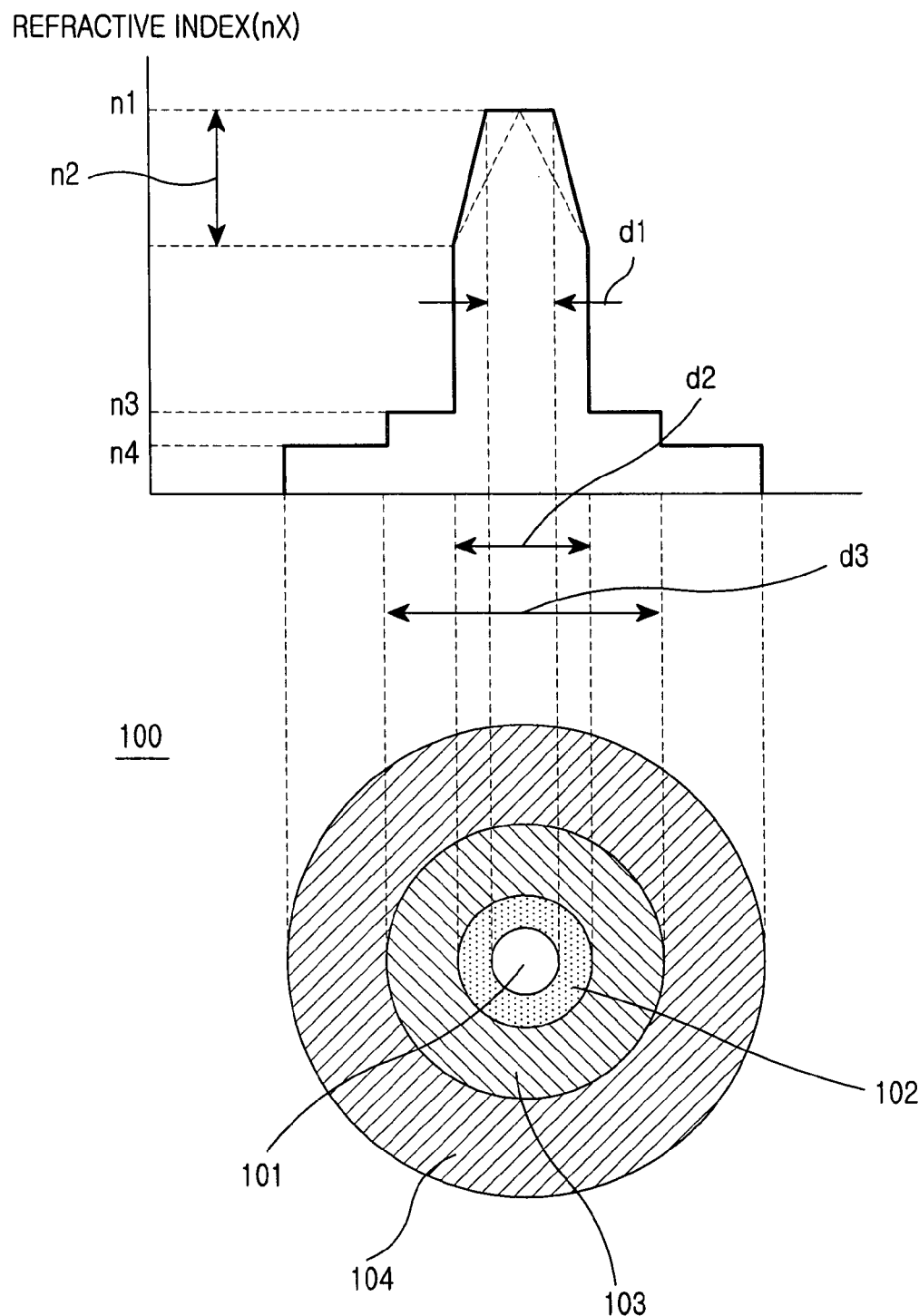
FIG. 2 is a wide-band dispersion controlled optical fiber according to a preferred embodiment of the present invention and a graph showing the distribution of refractive indexes of the optical fiber.

FIG. 2 is a wide-band dispersion controlled optical fiber 100 according to a preferred embodiment of the present invention and a graph showing the distribution of refractive indexes of the optical fiber. As shown in FIG. 2, wide-band dispersion controlled optical fiber 100 comprises an internal core 101, an external core 102, an internal clad 103, and an external clad 104.

Internal core 101 has a constant refractive index n1 and a diameter d1.

External core 102 encloses internal core 101 and has a diameter d2, wherein the refractive index n2(r) decreases from n1 as advancing from the diameter d1 to the diameter d2.

Internal clad 103 encloses external core 102 and has a diameter d3, wherein Internal clad 103 is evenly distributed with a refractive index n3 in the diametric direction, which is smaller than the refractive indexes n1 and n2(r).

External clad 104 is constantly distributed with a refractive index n4 in the diametric direction, which is smaller that the refractive index n3 of internal clad 103.

As shown by dotted lines in FIG. 2, the diameter of internal core 101 is substantially zero and the refractive index may be acutely distributed at the center of external core 102.

The distribution of the refractive index n2(r) may be defined by Equation 1 as follows:

$$n2(r) = n1\left[1 - \left(\frac{n1-n2}{n1}\right)\left(\frac{2r-d1}{d2-d1}\right)^{a_{co}}\right] \quad \text{Equation 1}$$

Here, r is measured from the center of wide-band dispersion controlled optical fiber 101 and indicates a radius of an optional position within the external core, in which $d1 \leq 2r \leq d2$, d1 indicates the diameter of internal core 101, in which $0 \leq d1 \leq d2$, and $\alpha_{co}$ is a refractive index determining coefficient, in which $0 < \alpha_{co} \leq \infty$.

In addition, the refractive indexes n1 to n4 and diameters d1 to d3 of internal core 101, external core 102, internal clad 103 and external core 104 of wide-band dispersion controlled optical fiber 100 meet with the relationships defined by Equation 2 and Equation 3 as follows.

$$0 \leq \frac{d1}{d2} \leq 0.8 \quad \text{Equation 2}$$

$$0.1 \leq \frac{d2}{d3} \leq 0.5$$

$$0.0034 \leq \frac{n1-n4}{n1} \leq 0.007 \quad \text{Equation 3}$$

$$0 \leq \frac{n2-n4}{n2} \leq 0.0048$$

$$0 \leq \frac{n3-n4}{n3} \leq 0.0014$$

By controlling the refractive indexes n1 to n4 between cores 101 and 102 and clads 103 and 104 of optical fiber 100, wide-band dispersion controlled optical fiber 100 with diameters and distribution of refractive indexes as described above is tuned so that a cut-off wavelength is controlled to 1285 nm or less, a dispersion value in the O-band wavelength region is in the range of −12 to −4 ps/nm/km, and a dispersion value of the 1625 nm wavelength is in the range of 8 to 14 ps/nm/km, and a zero dispersion wavelength is positioned in the wavelength region of less than 1430 nm. In addition, the dispersion slope at the zero dispersion wave is controlled to 0.0074 ps/nm²/km or less and the effective cross-section area is controlled to 75 μm² or less.

Hereinafter, the afore-mentioned dispersion controlled optical fiber 100 will be described in more detail.

Figure 3:
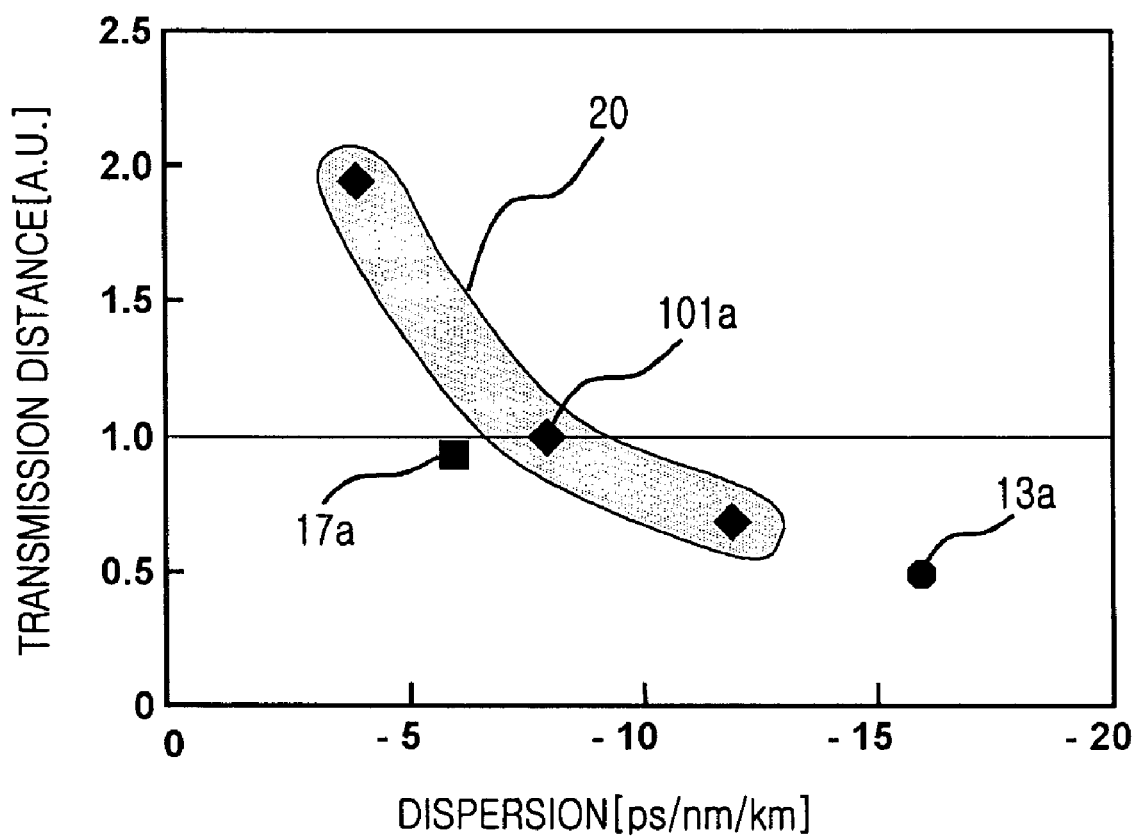
FIG. 3 is a graph showing the relationship between the negative dispersion characteristic and transmission distance.

Firstly, dispersion controlled optical fiber 100 has negative dispersion values when transmitting an O-band optical signal in the wavelength region of 1285 to 1330 nm. Therefore, it is preferable that optical fiber 100 is applied to middle/short distance transmission of about several hundreds km. FIG. 3 is a graph showing relative transmission distances in accordance with negative dispersion values. The graph of FIG. 3 compares the relative transmission distances of various optical fibers of different conditions, assuming that the transmittable distance of the optical fiber 100, which has a dispersion value of −8 ps/nm/km at the wavelength of 1310 nm, is 1 A.U. as indicated by 101a. A conventional negative dispersion optical fiber exhibits a performance similar to that of wide-band dispersion controlled optical fiber 100 if the negative dispersion optical fiber is used to perform middle/short distance transmission of an optical signal of the C-band wavelength region as indicated by 17a. This exemplifies the case in which the conventional negative dispersion optical fiber is used for middle/short distance transmission under a condition that it has a dispersion value of −6 ps/nm/km at the 1550 nm wavelength. It can be appreciated that the transmission distance of a conventional large effective area optical fiber 13a which has a dispersion value of −16 ps/nm/km is merely half of the transmission distance of wide-band dispersion controlled optical fiber 100.

According to the measuring results above, it becomes possible for wide-band dispersion controlled optical fiber 100 to obtain a performance similar to that of the conventional negative dispersion optical fiber in middle/short distance transmission by controlling the dispersion values of wide-band dispersion controlled optical fiber 100 to be in the range of −12 to −4 ps/nm/km indicated by 20 in the O-band wavelength region. Therefore, it has been found that it is possible to apply wide-band dispersion controlled optical fiber 100 to middle/short distance transmission using an optical signal in the O-band wavelength region.

Next, the conditions for transmitting an S-band optical signal using wide-band dispersion controlled optical fiber 100 will be described. From the characteristics of conventional positive dispersion optical fibers 13 and 15 shown in FIG. 1, which are used in a WDM mode communication network, it can be seen that zero dispersion wavelengths are positioned in the S-band wavelength region. Therefore, if an optical signal of the S-band wavelength region is transmitted through conventional positive dispersion optical fibers 13, 15, defects such as signal distortion, etc., due to FWM were generated and therefore signal quality was abruptly degraded. In this connection, it becomes possible for dispersion controlled optical fiber 100 to transmit an optical signal of the S-band wavelength region by controlling the refractive indexes of cores 101, 102 and clads 103, 104, so that zero dispersion wavelength is positioned in the wavelength region of less than 1430 nm.

Next, description will be made of these characteristics when wide-band diversion controlled optical fiber 100 is applied to long distance transmission of a C-band optical signal in the wavelength region of 1530 nm to 1565 nm and an L-band optical signal in the wavelength region of 1570 nm to 1605 nm. For the purpose of long distance transmission, the Raman amplification mode is applied in a WDM optical communication network. The Raman amplification is a method in which a pumping light is incident into an optical transmission line so that intensity of an optical signal is amplified by the reaction of the pumping light and the optical signal. According to the Raman amplification, maxim amplification 60 is obtained in wavelength region 68 which is shifted about 100 nm from wavelength region 64 of the pumping light to the long wavelength side, that is, when the frequency is increased by 13.3 THz.

Figure 4:
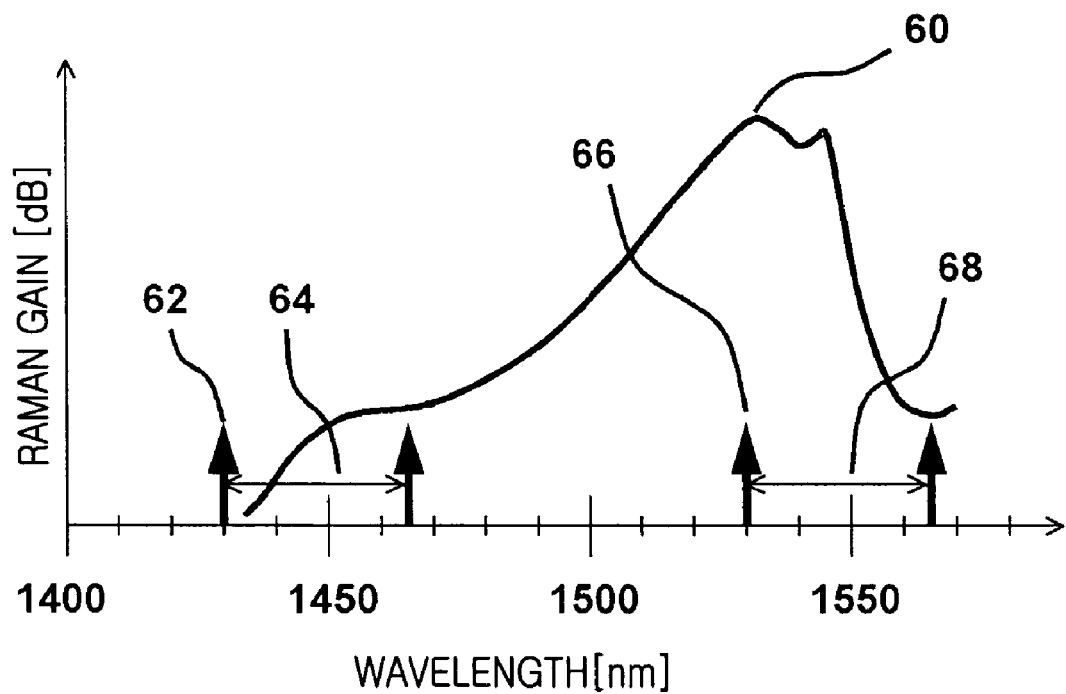
FIG. 4 is a graph showing a Raman gain curve.

As shown in FIG. 4, when a pumping light 62 with a wavelength of 1430 nm is incident, maximum amplification 60 is obtained from an optical signal 66 with a wavelength of 1530 nm. In order to amplify an optical signal in the C-band wavelength region 68, pumping light in the wavelength region 64 of 1430 nm to 1465 nm are incident in predetermined intervals and then an amplified optical signal is outputted in the wavelength region of 1530 nm to 1565 nm in an overlapped form Raman gain curves, one of which is indicated in FIG. 4.

Meanwhile, the zero dispersion wavelength is positioned in wavelength region 64 of a pumping light for amplifying an optical signal of the C-band wavelength region 68 as described above. Consequently, signal quality is deteriorated due to the four wave mixing (FWM). If the refractive indexes of cores 101, 102 and clads 103, 104 of optical fiber 100 are tuned, the zero dispersion wavelength is positioned in the wavelength region of less than 1430 nm.

In addition, in order to reduce costs for dispersion in long distance transmission using the WDM communication mode, lower dispersion values are required in a transferred wavelength region. In particular, because the dispersion values are increased as an optical signal is advanced to a longer wavelength, it is necessary to control the dispersion values in the L-band wavelength region as low as possible.

Figure 5:
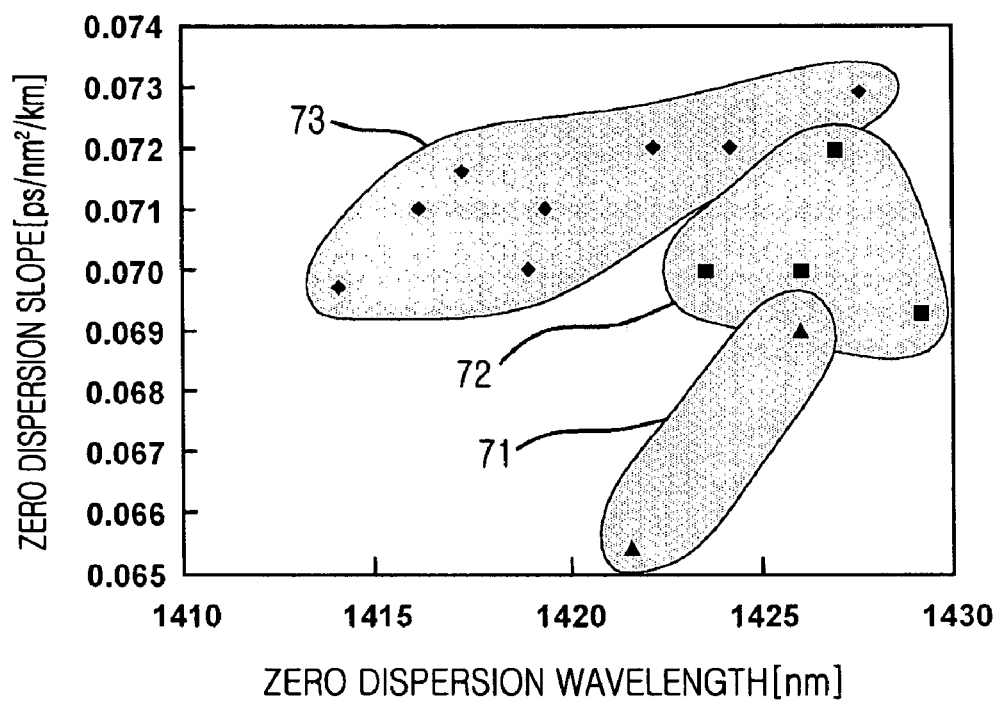
FIG. 5 is a graph showing the relationship between the dispersion wavelengths, dispersion slopes and 1625 nm dispersion of the dispersion controlled optical fiber shown in FIG. 2.

When the dispersion value at the wavelength of 1625 nm is controlled in a range of 8 to 14 ps/nm/km, costs can be reduced for dispersion in long distance transmission using an optical signal of the L-band wavelength region. FIG. 5 shows the relationship between zero dispersion wavelengths and dispersion slopes at the zero dispersion wavelengths when dispersion values are in the range of 8 to 14 ps/nm/km in 1625 nm wavelength. In FIG. 5, reference numeral 71 indicates the case in which the dispersion values are controlled to 12.5 ps/nm/km or less at 1625 nm wavelength. Reference numeral 72 indicates the case in which the dispersion values are in the range of 12.5 to 13 ps/nm/km at 1625 nm wavelength. Reference numeral 73 indicates the case in which the dispersion values are in the range of 13 to 13.5 ps/pm/nm at 1625 nm wavelength. As shown in FIG. 5, as the dispersion slopes are lowered, the dispersion values are also lowered. Consequently, lowering the dispersion slopes is advantageous in long distance transmission using an optical signal of the L-band wavelength region.

According to measurement results, it is possible to control wide-band dispersion controlled optical fiber 100 so that (1) the dispersion slope in the zero dispersion wavelength is controlled to 0.074 ps/nm²/km or less, (2) the zero dispersion wavelength is positioned in the wavelength region of less than 1430 nm in order to control the dispersion values to 14 ps/nm/km or less at 1625 nm wavelength which is longer than the L-band wavelength region. As the dispersion values are controlled to within a predetermined range at 1625 nm wavelength as described above, the long distance transmission of the L-band wavelength region becomes possible. This becomes possible by setting the distribution of refractive indexes of wide-band dispersion controlled optical fiber 100 in accordance with Equation 2 and Equation 3 as mentioned above.

In addition, it is possible to obtain a Raman gain efficiency by controlling the effective cross-section area of the optical fiber 100 to 75 $\mu m^2$ or less. The Raman gain efficiency is defined by Equation 4 as follows.

$$G \alpha \frac{g}{A_{eff}} P_{pump} L_{eff} \quad \text{Equation 4}$$

Here, G indicates Raman gain efficiency, g indicates Raman gain coefficient, $A_{eff}$ indicates effective cross-section area, $P_{pump}$ indicates output of pumping light, and $L_{eff}$ indicates effective distance.

Figure 6:
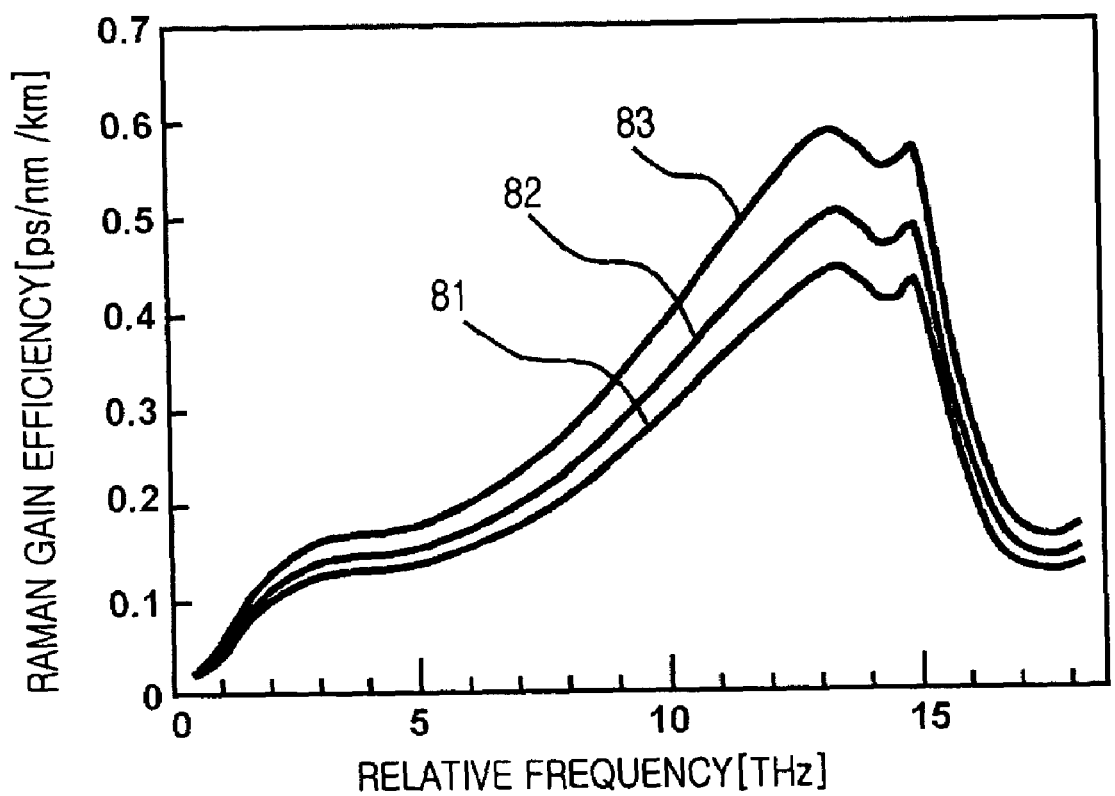
FIG. 6 is a graph showing Raman gain efficiency of the dispersion controlled optical fiber shown in FIG. 2.

From FIG. 6, the relationship between the effective cross-section area and the Raman gain efficiency can be understood. The relative frequency shown in FIG. 6, means the difference of the frequency between optical signal and the pumping light. The reference numerals 81, 82 and 83 indicate Raman gain efficiency in the cases in which the effective cross-section area is 80 $\mu m^2$, 70 $\mu m^2$, and 60 $\mu m^2$, respectively. From Equation 4 and FIG. 6, it can be seen that the Raman gain efficiency is enhanced as the effective cross-section area is reduced.

Figure 7:
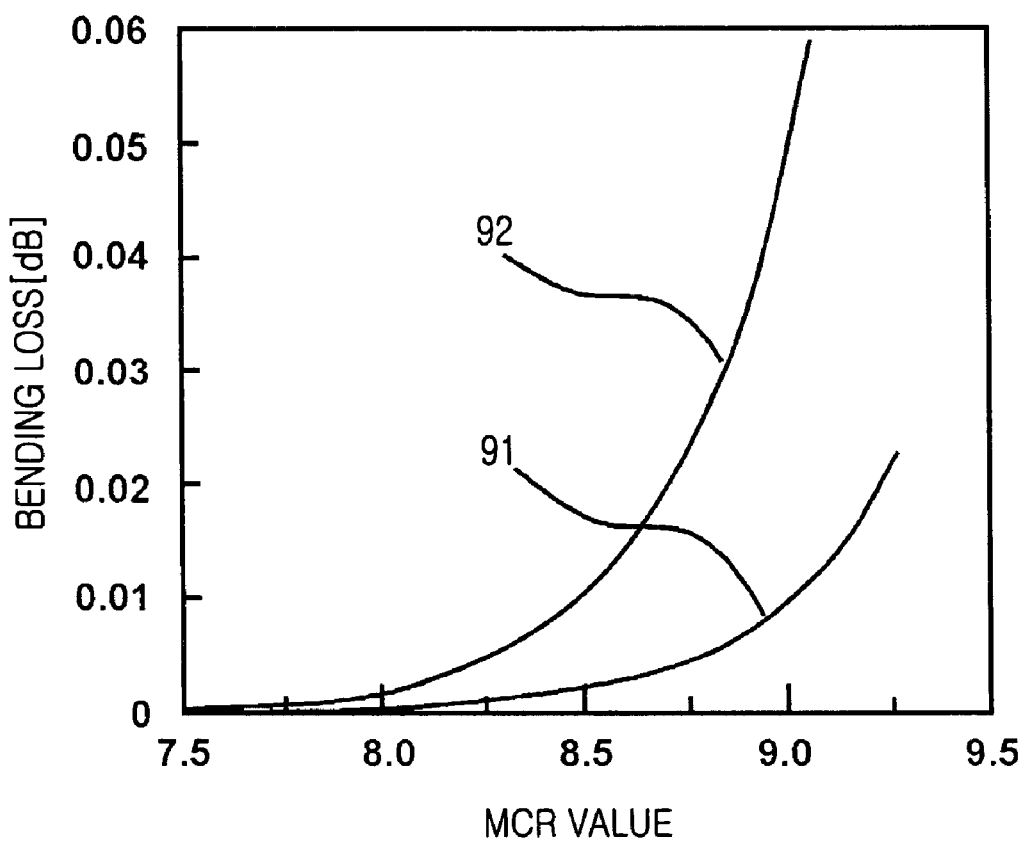
FIG. 7 is a graph showing bending loss of the dispersion controlled optical fiber shown in FIG. 2.

FIG. 7 is a graph showing the relationship between an MCR value and bending loss of the wide-band dispersion controlled optical fiber. "MCR value" is a value which indicates the ratio between mode field diameter and cut-off wavelength. From the drawing, it can be seen that the bending loss abruptly increases as the MCR value exceeds a specific level. As shown in FIG. 7, if the MCR value exceeds a specific level, the bending loss at 1625 nm wavelength indicated by the curve 92 abruptly increases as compared to the bending loss at 1550 nm wavelength indicated by the curve 91. Therefore, in order to avoid the bending loss of the dispersion controlled optical fiber 100, it is preferable to control the MCR value to within a certain range.

Figure 8:
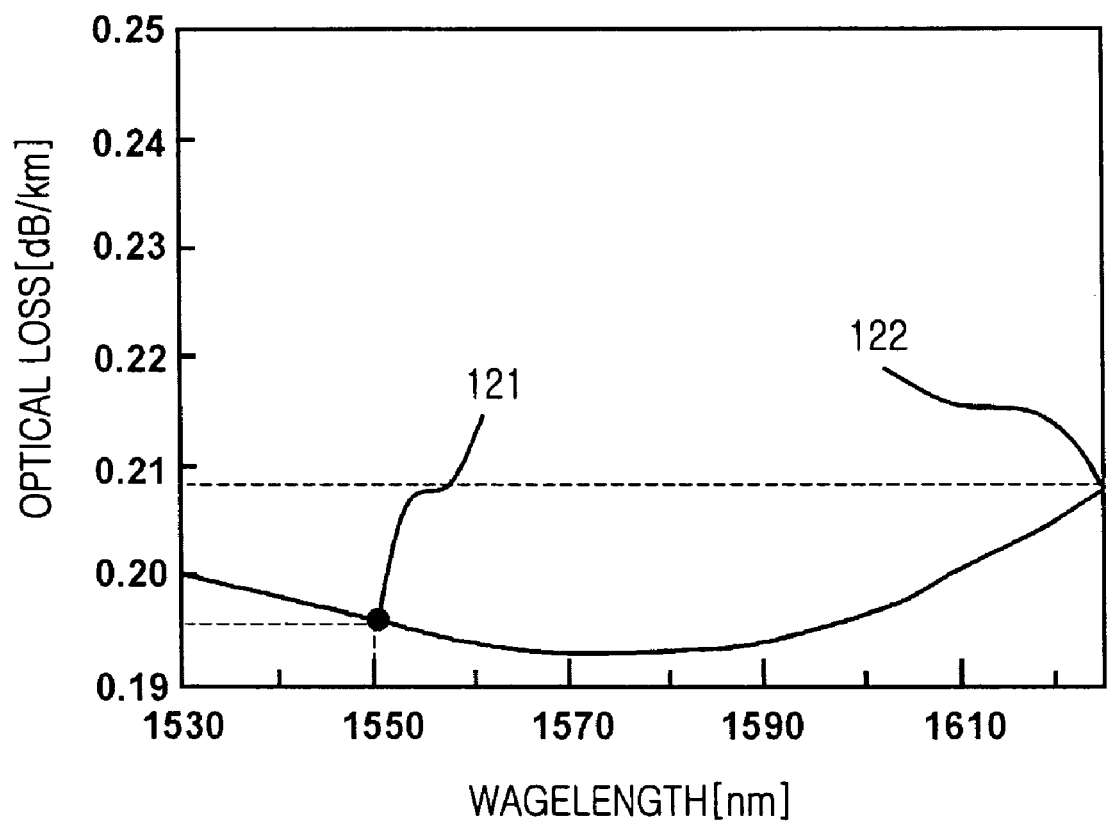
FIG. 8 is a graph showing optical loss of the dispersion controlled optical fiber shown in FIG. 2 in accordance with wavelengths.

FIG. 8 is a graph showing optical loss of the dispersion controlled optical fiber with an MCR value controlled to within a certain range in regard to wavelength ranges. The optical fiber with an controlled MCR value exhibits optical loss 121 of about 0.196 dB/km at the wavelength 1550 nm, optical loss 122 about 0.208 dB/km at the wavelength of 1625 nm. If the deviation of optical loss in accordance with wavelength increases, it is required to provide apparatus in each wavelength region for compensation, amplification, etc., in order to maintain signal quality. Therefore, wide-band dispersion controlled optical fiber 100 is advantageous in long distance transmission because the deviation of optical loss according to wavelength is limited to 0.03 dB/km or less by the MCR value being controlled.

The distribution values of an optical fiber manufactured by reflecting the above characteristics are listed in Table 1.

TABLE 1

| Wavelength (nm) | 1310 | 1285~1330 | 1430 | 1625 |
|---|---|---|---|---|
| Dispersion value (ps/nm/km) | −8.1 | −11.1~−6.4 | 0.9 | 12.8 |

As indicated in Table 1, because the dispersion value at 1430 nm wavelength is 0.9 ps/nm/km, the zero dispersion wavelength is located in the wavelength region below 1430 nm. The dispersion wavelength of the dispersion controlled optical fiber is measured as 1417.3 nm.

The characteristics of the dispersion controlled optical fiber with the dispersion values as indicated in Table 1 were measured as listed in Table 2.

TABLE 2

| Classification | Mode field diameter | Effective cross-section area | Loss | |
|---|---|---|---|---|
| Wavelength | 1625 nm | 1625 nm | 1550 nm | 1625 nm |
| Measured value | 9.92 μm | 73 μm$^2$ | 0.196 dB/km | 0.208 dB/km |

As described above, a wide-band dispersion controlled optical fiber according to the present invention makes it possible to use optical signals in various wavelength regions in a wavelength division multiplexing mode communication network by controlling the position of zero dispersion wavelength, and enables long distance transmission by controlling dispersion slope and bending loss. Furthermore, there is an advantage in that it is possible to perform not only short distance transmission but also middle/long distance transmission using one type of optical fiber because the optical fiber is controlled to have negative dispersion values in the O-band wavelength region and positive dispersion values with small deviation in the C-band and L-band wavelength regions.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wide-band dispersion controlled optical fiber, characterized in that a cut-off wavelength is substantially 1285 nm or less, dispersion values are −12 to −4 ps/nm/km in a wavelength region of substantially 1285 nm to 1330 nm and 8 to 14 ps/nm/km at substantially 1625 nm wavelength, a zero dispersion wavelength is positioned in a wavelength region below substantially 1430 nm, wherein the effective cross-section area of the optical fiber at substantially 1550 nm wavelength is less than 75 μm$^2$, and wherein the difference of losses between the 1550 nm wavelength and the 1625 nm wavelength is substantially 0.03 dB/km or less, wherein the wide-band dispersion controlled optical fiber includes an internal core which has a diameter d1 and a refractive index n1; an external core which encloses the internal core and has a diameter d2, the refractive index n2 of the external core gradually decreasing from n1 in the direction away from the center of the internal core; an internal clad which encloses the external core and has a diameter d3 and a refractive index n3; and an external clad which encloses the internal clad and has a refractive index n4, and wherein the diameters meet with the relationships of $0 \leq d1/d2 \leq 0.8$ and $0.1 \leq d2/d3 \leq 0.5$ and the refractive indexes meet with the relationships of $n1 > n2 \geq n3 \geq n4$, $0.0034 \leq (n1-n4)/n1 \leq 0.007$, $0 \leq (n2-n4)/n2 \leq 0.0048$, and $0 \leq (n3-n4)/n3 \leq 0.0014$.

2. The optical fiber according to claim 1, wherein the optical fiber has a dispersion slope of substantially 0.074 ps/nm$^2$/km or less at the zero dispersion wavelength.

3. The optical fiber according to claim 1, wherein the optical fiber has a dispersion value of −9 ps/nm/km or more at substantially 1310 nm wavelength.

4. The optical fiber according to claim 1, wherein the optical fiber has a loss of 0.25 dB/km or less at substantially 1625 nm wavelength.

5. The optical fiber according to claim 1, wherein the optical fiber has a bending loss of 0.05 dB or less at substantially 1550 nm when it is wound 100 turns around a roller with a diameter of 60 mm.

6. A wide-band dispersion controlled optical fiber, wherein a cut-off wavelength is 1285 nm or less, dispersion values are −12 to −4 ps/nm/km in a wavelength region of 1285 nm to 1330 nm and 8 to 14 ps/nm/km at 1625 nm wavelength, and the dispersion slope is 0.074 ps/nm$^2$/km or less at zero dispersion wavelength, wherein the optical fiber includes an internal core which has a diameter d1 and a refractive index n1; an external core which encloses the internal core and has a diameter d2, the refractive index n2 of the external core gradually decreasing from n1 in the direction away from the center of the internal core; an internal clad which encloses the external core and has a diameter d3 and a refractive index n3; and an external clad which encloses the internal clad and has diameter d4 and a refractive index n4, and wherein the diameters of the cores and clads meet with the relationships of $0 \leq d1/d2 \leq 0.8$ and $0.1 \leq d2/d3 \leq 0.5$ and the refractive indexes meet with the relationships of $n1 > n2 \geq n3 \geq n4$, $0.0034 \leq (n1-n4)/n1 \leq 0.007$, $0 \leq (n2-n4)/n2 \leq 0.0048$, and $0 \leq (n3-n4)/n3 \leq 0.0014$.

7. The optical fiber according to claim 6, wherein the zero dispersion wavelength of the optical fiber is positioned in a wavelength region of less than 1430 nm.

8. The optical fiber according to claim 6, wherein the effective cross-section area of the optical fiber is less than 75 μm$^2$ at 1550 nm wavelength.

9. The optical fiber according to claim 6, wherein the dispersion values are −6 ps/nm/km or less at 1310 nm and 14 ps/nm/km or less at 1625 nm wavelength.

10. The optical fiber according to claim 6, wherein the optical fiber has a bending loss of 0.05 dB or less at 1550 nm when it is wound 100 turns around a roller with a diameter of 60 mm.

11. A wide-band dispersion controlled optical fiber comprising:

an internal core with diameter d1 and a refractive index n1;

an external core enclosing the internal core with a diameter d2, the refractive index n2 of the external core gradually decreasing from n1 in the direction away from the center of the internal core;

an internal clad enclosing the external core with a diameter d3 and a refractive index n3; and an external clad enclosing the internal clad with a diameter d4 and a refractive index n4, wherein the diameters of the cores and clads meet with the relationships of $0 \leq d1/d2 \leq 0.8$ and $0.1 \leq d2/d3 \leq 0.5$ and the refractive indexes meet with the relationships of $n1 \leq n2 \geq n3 \geq n4$, $0.0034 \leq (n1-n4)/n1 \leq 0.007$, $0 \leq (n2-n4)/n2 \leq 0.0048$, and $0 \leq (n3-n4)/n3 \leq 0.0014$, so that the fiber has a predetermined cut-off wavelength and predetermined negative range of dispersion values in an O-band wavelength region, a predetermined dispersion value in a positive range the C-band and L-band wavelength regions, a zero dispersion wavelength positioned in a wavelength region of less than a predetermined value, and wherein a cross-section area at a predetermined wavelength is less than a predetermined value, and wherein deviation of optical loss according to wavelength is below a predetermined value.

12. The optical fiber according to claim 11, wherein the cut-off wavelength is 1285 nm or less and the dispersion values are −12 to −4 ps/nm/km in a wavelength region of 1250 nm to 1330 nm and 8 to 14 ps/nm/km at 1625 nm wavelength.

13. The optical fiber according to claim 11, wherein the zero dispersion wavelength is positioned in a wavelength region below 1430 nm.

14. The optical fiber according to claim 11, wherein the effective cross-section area at 1550 nm wavelength is less than 75 $\mu m^2$.

15. The optical fiber according to claim 11, wherein the deviation of optical loss according to wavelength is below a predetermined value is 0.03 dB/km or less.

* * * * *